(12) United States Patent
Hall et al.

(10) Patent No.: US 9,902,641 B2
(45) Date of Patent: Feb. 27, 2018

(54) MOLDS FOR SHAPING GLASS-BASED MATERIALS AND METHODS FOR MAKING THE SAME

(71) Applicant: CORNING INCORPORATED, Corning, NY (US)

(72) Inventors: Jill Marie Hall, Campbell, NY (US); Nicholas Scott Ryan, Painted Post, NY (US); Wenchao Wang, Ithaca, NY (US); Kim E Womer, Beaver Dams, NY (US)

(73) Assignee: CORNING INCORPORATED, Corning, NY (US)

( * ) Notice: Subject to any disclaimer, the term of this patent is extended or adjusted under 35 U.S.C. 154(b) by 190 days.

(21) Appl. No.: 15/071,889

(22) Filed: Mar. 16, 2016

(65) Prior Publication Data

US 2016/0272530 A1    Sep. 22, 2016

Related U.S. Application Data

(60) Provisional application No. 62/135,841, filed on Mar. 20, 2015.

(51) Int. Cl.
*C03B 23/035* (2006.01)
*C03B 23/023* (2006.01)
(Continued)

(52) U.S. Cl.
CPC ........ *C03B 23/0357* (2013.01); *C03B 11/086* (2013.01); *C03B 23/0235* (2013.01);
(Continued)

(58) Field of Classification Search
CPC ........ C03B 11/06–11/086; C03B 11/00; C03B 40/00; C03B 23/002; C03B 23/023;
(Continued)

(56) References Cited

U.S. PATENT DOCUMENTS

| 1,575,122 A | 3/1926 | Madsen |
| 4,471,034 A * | 9/1984 | Romero ................... B23K 9/04 249/135 |

(Continued)

FOREIGN PATENT DOCUMENTS

JP    2002348127    12/2002

OTHER PUBLICATIONS

International Search Report and Written Opinion of the International Searching Authority; PCT/US2016/022739; dated Jun. 17, 2016.

*Primary Examiner* — Nahida Sultana
(74) *Attorney, Agent, or Firm* — John T. Haran

(57) ABSTRACT

A mold for shaping glass-based material can include a mold body having a surface, wherein at least a portion of the mold body near the surface comprises at least about 90% by weight nickel and from about 0.2% to about 0.35% by weight manganese; and a nickel oxide layer on the surface of the mold body. The nickel oxide layer has first and second opposing surfaces wherein the first surface of the nickel oxide layer contacts and faces the surface of the mold body and the second surface of the nickel oxide layer includes a plurality of grains. The plurality of grains has an average grain size of about 150 µm or less.

20 Claims, 2 Drawing Sheets

(51) Int. Cl.
*C23C 8/10* (2006.01)
*C22C 19/03* (2006.01)
*C22F 1/10* (2006.01)
*C03B 11/08* (2006.01)

(52) U.S. Cl.
CPC ............... *C22C 19/03* (2013.01); *C22F 1/10* (2013.01); *C23C 8/10* (2013.01); *C03B 2215/03* (2013.01); *C03B 2215/11* (2013.01); *C03B 2215/20* (2013.01); *C03B 2215/32* (2013.01); *Y02P 40/57* (2015.11)

(58) Field of Classification Search
CPC ............ C03B 23/0252; C03B 23/0302; C03B 23/0355; C03B 23/0357
See application file for complete search history.

(56) References Cited

U.S. PATENT DOCUMENTS

| | | | |
|---|---|---|---|
| 4,483,700 A | 11/1984 | Forker, Jr. et al. | |
| 4,818,301 A * | 4/1989 | Khare | C22F 1/10 148/427 |
| 4,830,655 A * | 5/1989 | Franek | C03B 11/084 65/286 |
| 4,830,656 A * | 5/1989 | Chalon | B22C 9/02 164/58.1 |
| 5,305,339 A * | 4/1994 | Nakatani | H01S 3/0971 372/38.05 |
| 5,342,426 A | 8/1994 | Dumbaugh, Jr. | |
| 5,674,790 A | 10/1997 | Araujo | |
| 6,416,564 B1 * | 7/2002 | Bond | C22B 9/20 148/677 |
| 6,502,423 B1 | 1/2003 | Ostendarp et al. | |
| 6,758,064 B1 | 7/2004 | Kariya | |
| 7,409,839 B2 | 8/2008 | Boratav et al. | |
| 7,666,511 B2 | 2/2010 | Ellison et al. | |
| 7,685,840 B2 | 3/2010 | Allaire et al. | |
| 7,770,414 B2 | 8/2010 | Cimo et al. | |
| 8,158,543 B2 | 4/2012 | Dejneka et al. | |
| 8,210,001 B2 | 7/2012 | Allan et al. | |
| 8,586,492 B2 | 11/2013 | Barefoot et al. | |
| 8,701,443 B2 | 4/2014 | Bailey et al. | |
| 8,783,066 B2 | 7/2014 | Bailey et al. | |
| 8,802,581 B2 | 8/2014 | Dejneka et al. | |
| 8,969,226 B2 | 3/2015 | Dejneka et al. | |
| 9,145,323 B2 | 9/2015 | Horn et al. | |
| 9,266,768 B2 | 2/2016 | Horn et al. | |
| 2005/0223742 A1 * | 10/2005 | Pai | C03B 11/086 65/26 |
| 2011/0038748 A1 * | 2/2011 | Channel | C22C 1/0433 419/8 |
| 2012/0135226 A1 | 5/2012 | Bookbinder et al. | |
| 2013/0004758 A1 | 1/2013 | Dejneka et al. | |
| 2013/0323444 A1 | 12/2013 | Ehemann et al. | |
| 2014/0202211 A1 | 7/2014 | Horn et al. | |
| 2015/0129093 A1 * | 5/2015 | Forbes Jones | C21D 6/004 148/567 |

\* cited by examiner

MOLDS FOR SHAPING GLASS-BASED
MATERIALS AND METHODS FOR MAKING
THE SAME

CROSS-REFERENCE TO RELATED APPLICATIONS

This application claims the benefit of priority under 35 U.S.C. § 119 of U.S. Provisional Application Ser. No. 62/135,841 filed on Mar. 20, 2015 the content of which is relied upon and incorporated herein by reference in its entirety.

BACKGROUND

Field

The present specification generally relates to molds and, more specifically, to molds for shaping glass-based materials.

Technical Background

The current demand in modern electronics devices for thin, three dimensional glass-based substrates that have very high levels of surface quality has produced a need to find new materials and processes that are commercially capable of providing defect-free shaped glass-based substrates. Shaped glass forming generally refers to high temperature processes that involve heating the glass to be formed to a temperature at which it can be manipulated, and then conforming it to a mold to get the designed shape. Classic methods of shaping glass substrates include television tube forming, where a softened glass gob is pressed between male & female molds, and bottle forming, where glass is blown in a pair of hollowed molds.

In shaping operations, mold material selection is often the key to success. In order to optimize the shape and surface quality of the formed glass-based article, the mold material must: 1) have excellent oxidation and corrosion resistances at the process temperatures; 2) have minimal reaction with the glass (no sticking); and 3) be strong enough at the process temperature in order to resist the deformation and distortion from the forming force.

In reality, it can be difficult to select one material to meet all the above requirements. One solution has been to apply coatings on the mold surface to get the combined merits of the various materials to achieve forming success. Coated molds are the most commonly used in the glass forming industries today. Uncoated molds (or bare molds) are rare, and are limited to lower-end glass-based products such as bottles and certain glassware that don't require high surface quality. If bare molds are used, there is generally some level of lubrication applied to help with the forming process and to retain surface quality. These lubricants are difficult to consistently apply and require a secondary cleaning step to remove. For higher-end products, especially for optical-quality products such as press-formed camera lenses, coatings have been deemed as essential.

Although coatings help to meet the challenges in glass forming process, they create new problems. For example, coatings can add significant costs and new variables to manage the processes. More importantly, coatings often deteriorate during operation and lose functionality, limiting the lifetime of the mold and necessitating frequent re-coating. Therefore, there is an unmet need in the area of high-end, high quality glass-based substrates to obtain better mold materials that are commercially capable of providing defect-free, shaped glass-based substrates.

SUMMARY

The embodiments described herein relate to molds for shaping glass-based materials, methods for making the mold, and methods for shaping a glass-based substrate. According to one embodiment, a mold for shaping glass-based material can include a mold body having a surface, wherein at least a portion of the mold body near the surface comprises at least about 90% by weight nickel and from about 0.2% to about 0.35% by weight manganese; and a nickel oxide layer on the surface of the mold body. The nickel oxide layer has first and second opposing surfaces wherein the first surface of the nickel oxide layer contacts and faces the surface of the mold body and the second surface of the nickel oxide layer includes a plurality of grains. The plurality of grains has an average grain size of about 150 µm or less.

In another embodiment, a method for making a mold for shaping glass-based material can include providing a mold body having a surface, wherein at least a portion of the mold body near the surface comprises at least about 90% by weight nickel and from about 0.2% to about 0.35% by weight manganese; and forming a nickel oxide layer on the surface of the mold body. The nickel oxide layer has first and second opposing surfaces wherein the first surface of the nickel oxide layer contacts and faces the surface of the mold body and the second surface of the nickel oxide layer includes a plurality of grains. The plurality of grains has an average grain size of about 150 µm or less.

In yet another embodiment, a method for shaping a glass-based substrate, wherein the method includes placing a glass-based substrate on a mold and heating the glass-based substrate to a temperature sufficient to allow for shaping of the glass-base substrate. The mold can include a mold body having a surface, wherein at least a portion of the mold body near the surface comprises at least about 90% by weight nickel and from about 0.2% to about 0.35% by weight manganese; and a nickel oxide layer on the surface of the mold body. The nickel oxide layer has first and second opposing surfaces wherein the first surface of the nickel oxide layer contacts and faces the surface of the mold body and the second surface of the nickel oxide layer includes a plurality of grains. The plurality of grains has an average grain size of about 150 µm or less.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

FIG. 1 schematically depicts the structure of a mold for shaping glass, according to one or more embodiments shown and described herein.

DETAILED DESCRIPTION

Figure 1:
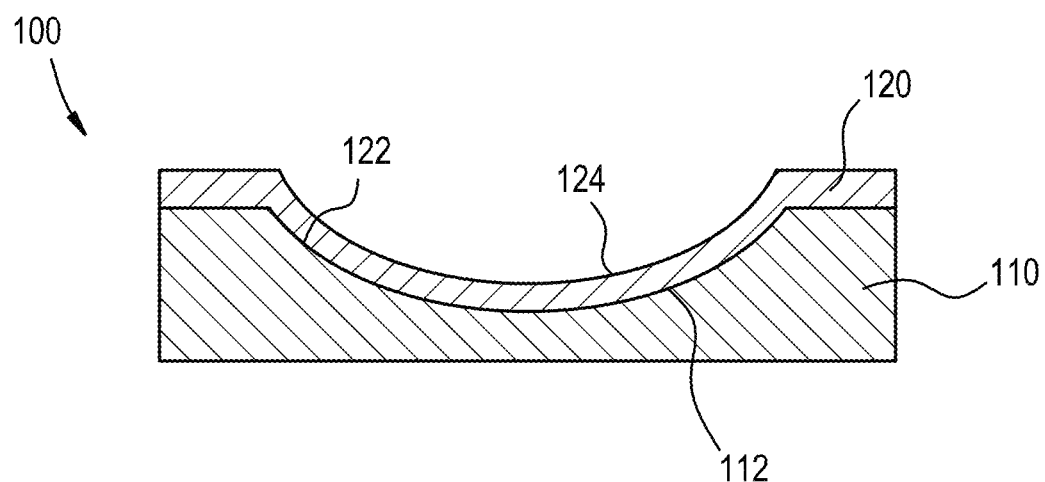

Reference will now be made in detail to various embodiments of molds for shaping glass-based materials and methods for making molds for shaping glass-based materials, examples of which are illustrated in the accompanying drawings. Whenever possible, the same reference numerals will be used throughout the drawings to refer to the same or like parts. Embodiments of methods for making molds for shaping glass-based materials, as well as embodiments of molds for shaping glass-based materials, will be described in more detail herein with specific reference to the appended drawings.

The following description is provided as an enabling teaching. To this end, those skilled in the relevant art will recognize and appreciate that many changes can be made to the various embodiments described herein, while still obtaining the beneficial results. It will also be apparent that some of the desired benefits can be obtained by selecting some of the features without utilizing other features. Accordingly, those who work in the art will recognize that many modifications and adaptations to the present embodiments are possible and can even be desirable in certain circumstances and are a part of the present description. Thus, the following description is provided as illustrative and should not be construed as limiting.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the meanings detailed herein.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise As used herein, the term "glass-based" includes glass and glass-ceramic materials.

As used herein, the term "substrate" describes a glass-based sheet that may be formed into a three-dimensional structure.

Generally, disclosed herein is a mold for shaping glass-based material, a process for making such a mold, and a process for shaping a glass-based substrate. Glass-based articles formed using the molds described herein may have a reduced number of defects. Ideally, the as formed quality of the part would be as good as the glass-based sheet from which it is formed. For the most economical process, one desires that this surface quality is achieved without further rework or polishing of the as formed surface. Defects, as used herein, include, but are not limited to, dimples (depressions in the glass-based surface), surface checks/cracks, blisters, chips, cords, dice, observable crystals, laps, seeds, stones, orange peel defects (pits in the formed glass-base material from raised areas on the mold surface, such as grain boundary areas, for example pits having 0.1 micron in height with a diameter greater than 30 microns), and stria. To that end, disclosed herein is a mold including a mold body having a surface, wherein at least a portion of the mold body near the surface has at least about 90% by weigh nickel and from about 0.2% to about 0.35% by weight manganese. The mold also includes a nickel oxide layer on the surface of the mold body wherein the nickel oxide layer has first and second opposing surfaces with the first surface contacting and facing the surface of the mold body and the second surface having a plurality of grains. The plurality of grains has an average grain size of about 150 μm or less, about 100 μm or less or about 50 μm or less.

Embodiments herein comprise nickel metal-based molds that are useful in the formation of glass-based substrates, such as three-dimensional glass-based substrates. The glass-based substrates may be useful as front and/or back covers for electronics devices, such as telephones, electronic tablets, televisions etc. In these electronics applications, the shape and the surface quality of the glass-based substrate may need to be within very tight tolerances in order to provide not only aesthetic appeal, but also to minimize weaknesses in the surface of the glass-based material, potential electronics issues, and minimize costs.

In some embodiments, as shown for example in FIG. 1, a mold 100 has a mold body 110 with a surface 112 and a nickel oxide layer 120 formed on at least a portion of surface 112 of mold body 110. Nickel oxide layer 120 has a first surface 122 contacting and facing surface 112 of mold body 110 and a second surface 124 opposite first surface 122. In some embodiments, second surface 124 of nickel oxide layer 120 serves as a shaping surface for the mold 100 and is the surface to which the glass-based material contacts and conforms during a shaping process. Thus, the shape of surface 112 of mold body 110 can affect the shape of second surface 124 of nickel oxide layer 120, which in turn can affect the shape to which a glass-based material will be shaped. It should be understood that surface 112 of mold body 110 and thus second surface 124 of nickel oxide layer 120 can have a wide variety of shapes to form varying three dimensionally shaped glass-based articles. In some embodiments, more than one mold body 110 may be utilized to form a glass-based article. For example, two mold bodies 110, each having nickel oxide layer 120 may make contact with opposite sides of a glass-based body to shape the glass-based body.

In some embodiments, mold body 110 may comprise greater than about 90% nickel. In some embodiments, mold body 110 may be made of a bulk material of greater than about 90% nickel, or may comprise a layer forming surface 112 of at least about 90% nickel on another bulk material. In embodiments, where forming surface 112 is a layer formed on another bulk material, a thickness of the layer including forming surface 112 can be at least about 20 μm, at least about 30 μm, at least about 40 μm, or at least about 50 μm. In some embodiments, mold body 110 may have high purities of nickel, such as commercially-pure nickel, for formation of three-dimensional glass-based substrates. High purity nickel metals, as described below, may have excellent high temperature oxidation and corrosion resistances, as well as excellent non-sticking characteristics when contacted by the softened glass-based material. High purity nickels may be relatively soft, and therefore have been thought to not be strong enough for conventional glass-based material forming operations. However, because the embodied processes do not apply heavy force on the mold 100, they allow for use of these materials in novel ways.

In some embodiments, the entire mold body 110 may comprise high purity nickel. In other embodiments, at least a portion of mold body 110 including surface 112 may comprise high purity nickel. High purity nickel makes it possible to form optical-quality glass-based articles. As used herein, a high purity nickel includes mold bodies having at least a surface with a composition comprising at least about 90%, about 93%, about 95%, about 97%, about 98%, about 99%, or about 99.5%, by weight nickel. In some embodiments, at least surface 112 of mold body 110 may comprise about 95% to about 99.5%, about 95% to about 99%, about 95% to about 98%, about 95% to about 97%, about 97% to about 99.5%, about 97% to about 99%, about 97% to about 98%, about 98% to about 99.5%, about 98% to about 99%, or about 99% to about 99.5% by weight nickel.

Examples of nickel compositions that may be used herein include, but are not limited to, commercially pure nickel grades 200, 201, 205, 212, 222, and 233 (See. e.g., Special-Purpose Nickel Alloys, in ASM SPECIALTY HANDBOOK: NICKEL, COBALT AND THEIR ALLOYS, #06178G (ASM International 2000), herein incorporated by reference in its entirety).

In some embodiments, nickel oxide layer 120 can be formed on mold body 100 by exposing surface 112 of mold body 100 to an oxidizing heat treatment. The oxidizing heat treatment may include exposing the mold 100 to elevated temperatures sufficient to convert at least a portion of the nickel at surface 112 of mold body 110. An exemplary oxidizing heat treatment can include that disclosed in Pub. No. US 2014-0202211 A1, which is hereby incorporated by reference in its entirety.

Nickel oxide layer 120 formed on surface 112 of mold body 110 may have an average thickness of from about 500 nm to about 20 micron, about 1 micron to about 14 micron, about 1 micron to about 10 micron, or about 1.5 micron to about 2.5 micron. In some embodiments, the nickel oxide layer 110 on the mold 100 may have an average thickness of about 100 nm, about 200 nm, about 300 nm, about 400 nm, about 500 nm, about 750 nm, about 1 micron, about 2 micron, about 3 micron, about 4 micron, about 5 micron, about 6 micron, about 7 micron, about 8 micron, about 9 micron, about 10 micron, about 12 micron, about 15 micron, about 18 micron, or about 20 micron.

Figure 2:
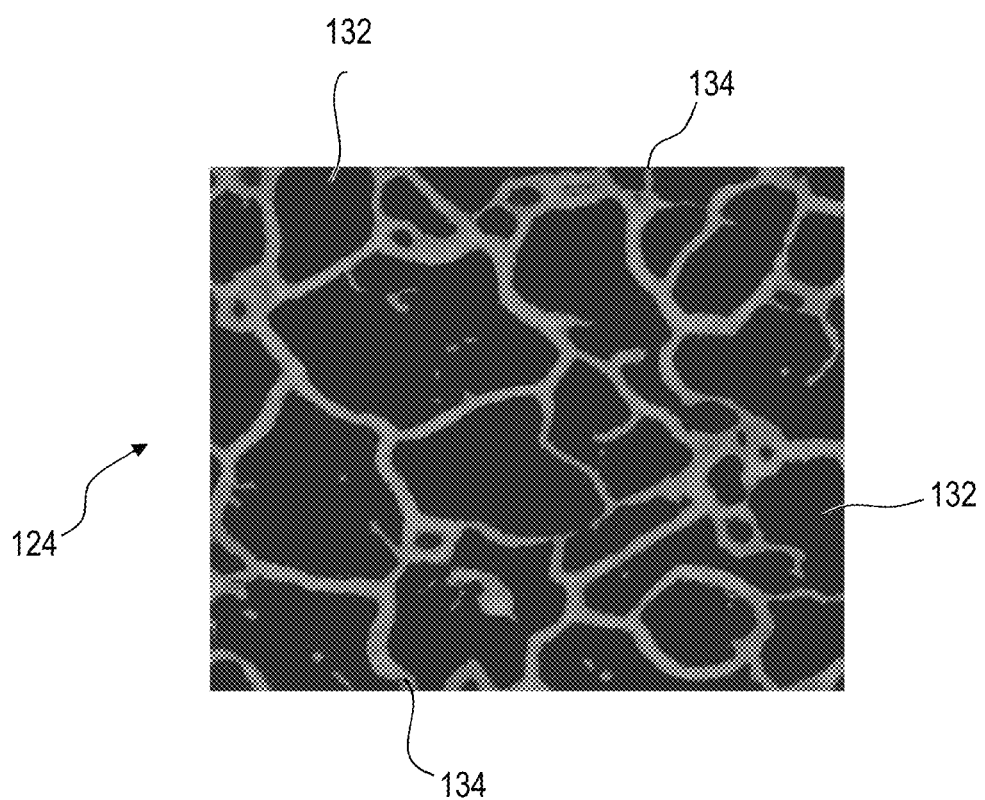
FIG. 2 is a view of an exemplary nickel oxide layer surface taken with a confocal microscope.

In some embodiments, mold 100 can include grains and the grains can grow during the oxidizing heat treatment. As shown for example in FIG. 2, the presence of grains can form two types of areas on the surface of mold 100—a grain body area 132 and a grain boundary area 134—on a surface of mold 100. During formation of nickel oxide layer 120, the nickel oxide can form faster on grain boundary areas 134 than on grain body areas 132. As a result, areas of surface 124 corresponding to grain boundary areas 134 will be raised relative to areas of surface 124 corresponding to grain body areas 132. During shaping of glass-based materials, the glass-based materials will contact the raised grain boundary areas 134 of mold 100 first when being shaped, potentially causing the pattern of the grain boundary areas 134 to be imprinted on the surface of the glass-based material depending upon the size of grain boundary areas 134. It has been found that reducing the size of the grain bodies, increases the percentage of the grain boundary areas 134 on surface 124. Increasing the area of the grain boundary areas 134 results in lower localized pressure at the glass-based material/grain boundary interface during shaping. The lower the localized pressure, the less likely a grain boundary impression will be seen on the shaped glass-based material. It has also been found that reducing the height differential between grain body areas 132 and grain boundary areas 134 can also minimize the likelihood that a grain boundary impression will be seen on the shaped glass-based material. Without being bound by theory, it is believed that manganese accumulates at the grain boundary areas and slows diffusion of nickel through the grain boundary areas to form the oxide layer and in turn slows the formation of the nickel oxide layer at the grain boundary areas, thereby minimizing the height differential.

In some embodiments, minimizing the impact of grain boundary impressions on glass-based materials shaped on mold 100 can be achieved by controlling the average grain size and/or an average height differential between the grain body areas and the grain boundary areas on surface 124 of nickel oxide layer 120. In some embodiments, the average grain size making up each grain body area 132 on surface 124 can be about 150 μm or less, about 145 μm or less, about 140 μm or less, about 135 μm or less, about 130 μm or less, about 125 μm or less, about 120 μm or less, about 115 μm or less, about 110 μm or less, about 105 μm or less, about 100 μm or less, about 95 μm or less, about 90 μm or less, about 85 μm or less, about 80 μm or less, about 75 μm or less, about 70 μm or less, about 65 μm or less, about 60 μm or less, about 55 μm or less, about 50 μm, about 45 μm or less, about 40 μm or less, about 35 μm or less, or about 30 μm or less. The average grain size can be determined by measuring the diameter of each grain at its widest point over a field of view and calculating the average value. The average grain size can be determined using image analysis software, such as Nikon Elements. The magnification can be 100× and the field of view can be 1 mm by 1 mm. The average grain size can be calculated based on 3 fields of view. In some embodiments, the average size of the grains making up each grain body area 132 on surface 124 of nickel oxide layer 120 can be about 4 or above, about 4.5 or above, about 5 or above, about 5.5 or above, about 6 or above, about 6.5 or above, or about 7 or above as measured using ASTM E112-13 and its progeny. The larger the value for ASTM E112-13, the smaller the average grain size. The benefits of a smaller grain size are discussed above.

In some embodiments, the average height differential between grain body areas 132 and grain boundary areas 134 on surface 124 of nickel oxide layer 120 can be about 1.5 μm or less, about 1.25 μm or less, about 1 μm or less, about 0.75 μm or less, about 0.5 μm or less, or about 0.25 μm or less. In some embodiments, the average height differential can be measured by determining the average peak surface roughness ($R_p$) on surface 124 of nickel oxide layer 120. In some embodiments, this average surface roughness ($R_p$) is determined over an evaluation length, such as 100 μm, 10 mm, 100 mm, 1 cm, etc. As used herein, $R_p$ is defined as the difference between the maximum height and the average height and can be described by the following equation:

$$R_p = \max_i y_i,$$

where $y_i$ is the maximum height relative to the average surface height. The $R_p$ can be measured using a confocal microscope, such as one available from Zeiss, or an optical profilometer, such as one available from Zygo.

In some embodiments, the average grain size and/or height differential between the grain body areas and grain boundary areas can be controlled by controlling the amount of manganese, silicon, titanium, aluminum, iron, boron, copper, chromium, zirconium, and/or lanthanum in mold body 110 as a whole or in a region near surface 112. The amount of manganese, silicon, titanium, aluminum, iron, boron, copper, chromium, zirconium, and/or lanthanum in mold body 110 can be controlled by mixing oxides containing one or more of these elements in a desired amount in the slag used to form the bulk material, which is then used to form mold body 110.

In some embodiments, the amount of manganese in mold body 110 as a whole or in a region near surface 112 can be controlled. In such embodiments, at least a portion of mold body 110 near surface 112, which may include the entirety of mold body 110, may include from about 0.2% to about 0.35%, about 0.2% to about 0.34%, about 0.2% to about 0.33%, about 0.2% to about 0.32%, about 0.2% to about 0.31%, about 0.2% to about 0.3%, about 0.2% to about 0.29%, about 0.2% to about 0.28%, about 0.2% to about 0.27%, about 0.2% to about 0.26%, about 0.2% to about 0.25%, about 0.2% to about 0.24%, about 0.2% to about 0.23%, about 0.2% to about 0.22%, about 0.2% to about 0.21%, about 0.21% to about 0.35%, about 0.21% to about 0.34%, about 0.21% to about 0.33%, about 0.21% to about 0.32%, about 0.21% to about 0.31%, about 0.21% to about 0.3%, about 0.21% to about 0.29%, about 0.21% to about 0.28%, about 0.21% to about 0.27%, about 0.21% to about 0.26%, about 0.21% to about 0.25%, about 0.21% to about 0.24%, about 0.21% to about 0.23%, about 0.22% to about 0.35%, about 0.22% to about 0.34%, about 0.22% to about 0.33%, about 0.22% to about 0.32%, about 0.22% to about 0.31%, about 0.22% to about 0.3%, about 0.22% to about 0.29%, about 0.22% to about 0.28%, about 0.22% to about 0.27%, about 0.22% to about 0.26%, about 0.22% to about 0.25%, about 0.22% to about 0.24%, about 0.22% to about 0.23%, about 0.23% to about 0.35%, about 0.23% to about 0.34%, about 0.23% to about 0.33%, about 0.23% to about 0.32%, about 0.23% to about 0.31%, about 0.23% to about 0.3%, about 0.23% to about 0.29%, about 0.23% to about 0.28%, about 0.23% to about 0.27%, about 0.23% to about 0.26%, about 0.23% to about 0.25%, about 0.23% to about 0.24%, about 0.24% to about 0.35%, about 0.24% to about 0.34%, about 0.24% to about 0.33%, about 0.24% to about 0.32%, about 0.24% to about 0.31%, about 0.24% to about 0.3%, about 0.24% to about 0.29%, about 0.24% to about 0.28%, about 0.24% to about 0.27%, about 0.24% to about 0.26%, about 0.24% to about 0.25%, about 0.25% to about 0.35%, about 0.25% to about 0.34%, about 0.25% to about 0.33%, about 0.25% to about 0.32%, about 0.25% to about 0.31%, about 0.25% to about 0.3%, about 0.25% to about 0.29%, about 0.25% to about 0.28%, about 0.25% to about 0.27%, about 0.25% to about 0.26%, about 0.26% to about 0.35%, about 0.26% to about 0.34%, about 0.26% to about 0.33%, about 0.26% to about 0.32%, about 0.26% to about 0.31%, about 0.26% to about 0.3%, about 0.26% to about 0.29%, about 0.26% to about 0.28%, about 0.26% to about 0.27%, about 0.27% to about 0.35%, about 0.27% to about 0.34%, about 0.27% to about 0.33%, about 0.27% to about 0.32%, about 0.27% to about 0.31%, about 0.27% to about 0.3%, about 0.27% to about 0.29%, about 0.27% to about 0.28%, about 0.28% to about 0.35%, about 0.28% to about 0.34%, about 0.28% to about 0.33%, about 0.28% to about 0.32%, about 0.28% to about 0.31%, about 0.28% to about 0.3%, about 0.28% to about 0.29%, about 0.29% to about 0.35%, about 0.29% to about 0.34%, about 0.29% to about 0.33%, about 0.29% to about 0.32%, about 0.29% to about 0.31%, about 0.29% to about 0.3%, about 0.3% to about 0.35%, about 0.3% to about 0.34%, about 0.3% to about 0.33%, about 0.3% to about 0.32%, about 0.3% to about 0.31%, 0.31% to about 0.35%, about 0.31% to about 0.34%, about 0.31% to about 0.33%, about 0.31% to about 0.32%, 0.32% to about 0.35%, about 0.32% to about 0.34%, about 0.32% to about 0.33%, 0.33% to about 0.35%, about 0.33% to about 0.34%, or about 0.34% to about 0.35% by weight manganese. In embodiments, where only a region near surface 112 has manganese in the recited ranges, the portion of mold body 110 having manganese in the recited ranges can extend about 20 μm or less, about 15 μm or less, about 10 μm or less, or about 5 μm or less from surface 112. Without be bound by theory, it is believed that having manganese within the ranges listed above will form intermetallic compounds and/or oxides that will inhibit the growth of grains in the nickel.

The glass-based articles formed using the molds 100 with nickel oxide layers 120 described herein may have a reduced number of defects. Ideally, the as formed quality of the part would be as good as the glass-based sheet from which it is formed. For the most economical process, one desires that this surface quality is achieved without further rework or polishing of the as formed surface. Defects, as used herein, include, but are not limited to, dimples (depressions in the glass-based surface), surface checks/cracks, blisters, chips, cords, dice, observable crystals, laps, seeds, stones, orange peel defects (pits in the formed glass-base material from raised areas on the mold surface, such as grain boundary areas, for example pits having 0.1 micron in height with a diameter greater than 30 microns), and stria. In some embodiments, there are less than an average of 50, 40, 30, 20, 10, 5, 4, 3, 2, or 1 defects that are observable by the unaided human eye at 1000 lux in a 25 mm×25 mm area on any of the surfaces. In some embodiments, there are less than an average of 50, 40, 30, 20, 10, 5, 4, 3, 2, or 1 defects that are 150 micron in the largest dimension in a 25 mm×25 mm area on any of the surfaces, as measured by optical microscopy. In some embodiments, the defect is 1, 2, 3, 5, 10, 20, 30, 40, 50, 60, 70, 80, 90, 100, 125, or 150 micron in the largest dimension.

In another embodiment, glass-based articles formed using molds 100 with nickel oxide layers 120 described herein may be essentially flawless. By "essentially flawless," it is meant that there are no indentations (or dimples) larger than 150 micron in diameter, as measured by an optical microscopy technique, in the surfaces. In some embodiments, there are less than an average of 50, 40, 30, 20, 10, 5, 4, 3, 2, or 1 indentations (or dimples) larger than 150 micron in diameter in the largest dimension in an 25 mm×25 mm area on any of the surfaces, as measured by optical microscopy. In some embodiments, the dimple size is larger than 1, 2, 3, 5, 10, 20, 30, 40, 50, 60, 70, 80, 90, 100, 125, or 150 micron in the largest dimension.

Without intending to be held to a particular theory, it is believed that the decrease in the level of defects on the as formed glass-based surface with high purity nickel molds 100 is due to at least two causes. First, nickel and nickel oxide appear to be unreactive with the glass. In particular, aluminosilicate glasses appear to be highly unreactive. By unreactive it is intended to mean that the glass-based material doesn't readily stick to the Ni mold material and there is no significant chemical reaction between the glass or glass volatiles that causes the build-up of material on the mold surface.

The second reason for the decreased level of defects on the as formed glass-based surface with high purity nickel is controlling the level of impurities and inclusions in the nickel. These impurities comprise one or more of the following: Cu, Fe, Mn, C, Si, S, Mg, Al and Ti. These impurities are typically present in the Ni based alloys as oxides, sulfides and carbides. In many if not most cases the oxides, sulfides and carbides exist in the microstructure of the Ni alloy as a distinct phase, commonly called an inclusion, that is randomly distributed throughout the alloy. A certain percentage of these inclusions will end up on the machined and polished surface of the mold. During the glass forming process, these inclusions that are at or near the mold surface can be reactive with the glass and stick to it, or oxidize and react at a rate that is different from the bulk metal and thus form a protrusion on the mold surface. However, as noted above, in some embodiments the molds include a controlled amount of Mn, Si, Ti, Al, Mg, Fe, and/or Cu to control the average grain size and/or average height differential between grain body areas and grain boundary areas to reduce the level of defects on the as formed glass-based surface after shaping resulting from grain boundaries. Thus, a balance is struck between including enough impurities, such as Mn, to achieve a desired average grain size and/or average height differential between grain body areas and grain boundary areas without add so much that too many inclusions are present on the molding surface.

In some embodiments, nickel oxide layer 120 may have an average surface roughness ($R_a$) of less than or equal to about 1 micron on surface 124. In some embodiments, this average surface roughness ($R_a$) is determined over an evaluation length, such as 100 µm, 10 mm, 100 mm, etc. or may be determined based on an analysis of the entire surface 124 of nickel oxide layer 120. As used herein, $R_a$ is defined as the arithmetic average of the differences between the local surface heights and the average surface height and can be described by the following equation:

$$R_a = \frac{1}{n}\sum_{i=1}^{n}|y_i|,$$

where $y_i$ is the local surface height relative to the average surface height. In other embodiments $R_a$ may be less than or equal to about 1 µm, 0.75 µm, 0.5 µm, or even 0.25 µm over an evaluation length of 10 mm. The $R_a$ can be measured using a confocal microscope, such as one available from Zeiss, or an optical profilometer, such as one available from Zygo.

In some embodiments, nickel oxide layer 120 may have a waviness height, $W_a$, which describes the peak-to-valley height of the surface profile of surface 124. In some embodiments, the $W_a$ is from about 1 nm to about 100 nm over an evaluation length of 1 cm. In some embodiments, the $W_a$ is less than about 1 nm, 2 nm, 5 nm, 10 nm, 20 nm, 40 nm, 60 nm, 80 nm, or 100 nm over an evaluation length of 1 cm. The $W_a$ can be measured using a confocal microscope, such as one available from Zeiss, or an optical profilometer, such as one available from Zygo.

Embodiments of molds 100 described herein may be used in any forming processes, such as 3D glass forming processes. The molds 100 are especially useful in forming 3D glass articles when used in combination with the methods and devices described in U.S. Pat. Nos. 8,783,066 and 8,701,443, which are hereby incorporated by reference in their entireties. The issue of glass sticking to mold 100 during the forming process is known to increase with increased mold/metal temperature. These mold temperatures are typically at least 100–200° C. hotter than the typical temperature of a mold 100 used in a pressing process and the operational temperature range in which vacuum forming occurs is in a region where mold to glass sticking can occur, which leads to cosmetic and structural defect formation in the glass. The embodied high purity nickel molds provide a novel means of addressing this sticking or adhesion issue and provide glass-based articles with little to no surface defects or flaws.

Molds 100 described herein may be utilized in making glass-based articles by forming a glass-based article by contacting a glass-based material with mold 100 at a temperature sufficient to allow for shaping of the glass-based material. In some embodiments, molds 100 may be used in the following process: a typical thermal reforming process involves heating the 2D glass-based sheet to a forming temperature, e.g., a temperature in a temperature range corresponding to a glass viscosity of $10^7$ Poise to $10^{11}$ Poise or between an annealing point and softening point of the glass, while the 2D glass-based sheet is on top of a mold 100. The heated 2D glass-based sheet may start sagging once heated. Typically, vacuum is then applied in between the glass-based sheet and mold 100 to conform the glass-based sheet to the surface 124 and thereby form the glass-based sheet into a 3D glass-based article. After forming the 3D glass-based article, the 3D glass-based article is cooled to a temperature below the strain point of the glass, which would allow handling of the 3D glass-based article.

The glass-based articles formed via the embodiments herein may be described by Publ. No. US 2013-0323444 A1. The three-dimensional (3D) glass-based articles can be used to cover an electronic device having a display, for example as part or all of the front, back, and or sides of the device.

The 3D cover glass can protect the display while allowing viewing of and interaction with the display. If used as the front cover, the glass-based articles can have a front cover glass section for covering the front side of the electronic device, where the display is located, and one or more side cover glass sections for wrapping around the peripheral side of the electronic device. The front cover glass section can be made contiguous with the side cover glass section(s).

The preformed glass used to in the processes described herein typically starts as a two dimensional (2D) glass sheet. The 2D glass sheet may be made by a fusion or float process. In some embodiments, the 2D glass sheet is extracted from a pristine sheet of glass formed by a fusion process. The pristine nature of the glass may be preserved up until the glass is subjected to a strengthening process, such as an ion-exchange chemical strengthening process. Processes for forming 2D glass sheets are known in the art and high quality 2D glass sheets are described in, for example, U.S. Pat. Nos. 5,342,426, 6,502,423, 6,758,064, 7,409,839, 7,685,840, 7,770,414, and 8,210,001.

In one embodiment, the glass is made from an alkali aluminosilicate glass composition. An exemplary alkali aluminosilicate glass composition comprises from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %≤$Li_2O$+$Na_2O$+$K_2O$≤20 mol % and 0 mol %≤MgO+CaO≤10 mol %. This alkali aluminosilicate glass is described in U.S. Pat. No. 8,158,543.

Another exemplary alkali-aluminosilicate glass composition comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein −340+27.1·$Al_2O_3$−28.7·$B_2O_3$+15.6·$Na_2O$−61.4·$K_2O$+8.1·(MgO+ZnO)≥0 mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. The glass is described in Pub. No. US 2013-0004758 A1, the contents of which are incorporated herein by reference in their entirety.

Other types of glass compositions besides those mentioned above and besides alkali-aluminosilicate glass composition may be used for the 3D cover glass. For example, alkali-aluminoborosilicate glass compositions may be used for the 3D cover glass. Preferably, the glass compositions used are ion-exchangeable glass compositions, which are generally glass compositions containing small alkali or alkaline-earth metals ions that can be exchanged for large alkali or alkaline-earth metal ions. Additional examples of ion-exchangeable glass compositions may be found in U.S. Pat. Nos. 7,666,511; 4,483,700; 5,674,790; 8,969,226; 8,158,543; 8,802,581; and 8,586,492, and Pub. No. US 2012-0135226 A1.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

It should now be understood that the molds disclosed herein may offer the advantage of reduced flaws on the surface of glass which is shaped by the herein disclosed molds. It should now also be understood that molds with superior surface characteristics may be produced by the methods described herein, particularly by utilizing the heating regimes disclosed herein to produce oxide layers on the shaping surfaces of the molds.

EXAMPLE

The nickel based molds with different compositions, each having a nickel oxide layer, where used to form a sheet of glass. Each mold had at least 99% by weight nickel. Table 1 below shows the composition of the molds other than nickel, the grain size as measured by ASTM E112-13, and a description of the formed glass surface.

TABLE 1

| Metal Sample | Quality of Formed Glass Surface | Mn | Cu | Si | Ti | Fe | C | Grain Size |
|---|---|---|---|---|---|---|---|---|
| A | Low texture | 0.24 | 0.13 | 0.1 | 0.1 | 0.02 | 0.02 | 6.7 |
| B | Orange peel | 0.09 | — | 0.06 | — | 0.07 | — | 3 |
| C | Orange peel | <0.01 | — | 0.06 | <0.0001 | — | — | −0.4 |

Glass formed using molds B and C had an orange peel effect (or high texture) on the surface, meaning that there were pits in the formed glass from raised areas on the mold surface. However, glass formed using mold A had a low texture meaning there were minimal pits in the formed glass. It can be seen from Table 1, that the grain size in mold A had a higher ASTM value (indicating a smaller grain size) than molds B and C. It is believed that the smaller grain size (higher ASTM value) resulted in the better texture in the formed glass. It is believed that the larger amount of manganese in mold A contributed to the smaller grain size (higher ASTM value) in mold A. It was unexpected that the amount of manganese would affect the grain size and thereby affect the texture of the formed glass surface.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Various modifications and variations can be made to the embodiments described herein without departing from the scope of the claimed subject matter. Thus it is intended that the specification cover the modifications and variations of the various embodiments described herein provided such modification and variations come within the scope of the appended claims and their equivalents.

We claim:

1. A mold for shaping glass-based material, the mold comprising:

a mold body having a surface, wherein at least a portion of the mold body near the surface comprises at least about 90% by weight nickel and from about 0.2% to about 0.35% by weight manganese; and a nickel oxide layer on the surface of the mold body, wherein:

the nickel oxide layer has first and second opposing surfaces, the first surface of the nickel oxide layer contacts and faces the surface of the mold body, the second surface of the nickel oxide layer includes a plurality of grains, and the plurality of grains has an average grain size of about 150 µm or less.

2. The mold of claim 1, wherein the second surface includes at least one grain body area and at least one grain boundary area and wherein an average height differential between the at least one grain body area and the at least one grain boundary area is about 1.5 µm or less.

3. The mold of claim 1, wherein the second surface of the nickel oxide layer has an average surface roughness (Ra) of about 1 micron or less.

4. The mold of claim 1, wherein the portion of the mold near the surface comprising at least about 90% by weight nickel and from about 0.2% to about 0.35% by weight manganese extends at least 20 microns from the surface.

5. The mold of claim 1, wherein the portion of the mold near the surface comprising at least about 90% by weight nickel and from about 0.2% to about 0.35% by weight manganese extends 20 microns or less from the surface.

6. The mold of claim 1, wherein the plurality of grains has an average grain size of about 100 µm or less.

7. The mold of claim 1, wherein the plurality of grains has an average grain size of about 50 µm or less.

8. The mold of claim 1, wherein the nickel oxide layer has an average thickness from about 500 nm to about 20 µm.

9. The mold of claim 1, wherein the second surface of the nickel oxide layer has a waviness height (Wa) of less than about 100 nm.

10. A method of making a mold for shaping glass-based material comprising:

providing a mold body having a surface, wherein at least a portion of the mold body near the surface comprises at least about 90% by weight nickel and from about 0.2% to about 0.35% by weight manganese; and forming a nickel oxide layer on the surface of the mold body, wherein:

the nickel oxide layer has first and second opposing surfaces, the first surface of the nickel oxide layer contacts and faces the surface of the mold body, the second surface of the nickel oxide layer includes a plurality of grains, and the plurality of grains has an average grain size of about 150 µm or less.

11. The method of claim 10, wherein the second surface includes at least one grain body area and at least one grain boundary area and wherein an average height differential between the at least one grain body area and the at least one grain boundary area is about 1.5 µm or less over.

12. The method of claim 10, wherein the second surface of the nickel oxide layer has an average surface roughness (Ra) of about 1 micron or less.

13. The method of claim 10, wherein the portion of the mold near the surface comprising at least about 90% by weight nickel and from about 0.2% to about 0.35% by weight manganese extends at least 20 microns from the surface.

14. The method of claim 10, wherein the portion of the mold near the surface comprising at least about 90% by weight nickel and from about 0.2% to about 0.35% by weight manganese extends 20 microns or less from the surface.

15. The method of claim 10, wherein the plurality of grains has an average grain size of about 100 µm or less.

16. The method of claim 10, wherein the plurality of grains has an average grain size of about 50 µm or less.

17. The method of claim 10, wherein the nickel oxide layer has an average thickness from about 500 nm to about 20 µm.

18. The method of claim 10, wherein the second surface of the nickel oxide layer has a waviness height (Wa) of less than about 100 nm.

19. The method of claim 10, further comprising adding manganese to a bulk nickel until the manganese content falls within the range from about 0.2 to about 0.35 weight % to form the mold body.

20. A method for shaping a glass-based substrate, the method comprising:

placing a glass-based substrate on a mold, wherein the mold comprises:

a mold body having a surface, wherein at least a portion of the mold body near the surface comprises at least about 90% by weight nickel and from about 0.2% to about 0.35% by weight manganese; and a nickel oxide layer on the surface of the mold body, wherein:

the nickel oxide layer has first and second opposing surfaces, the first surface of the nickel oxide layer contacts and faces the surface of the mold body, the second surface of the nickel oxide layer includes a plurality of grains, and the plurality of grains has an average grain size of about 150 µm or less; and heating the glass-based substrate to a temperature sufficient to allow for shaping of the glass-base substrate.

\* \* \* \* \*